Jan. 20, 1942.    S. C. KNEFEL    2,270,532
BOILER RETURN AND VACUUM TRAP
Filed Nov. 24, 1939    5 Sheets-Sheet 1
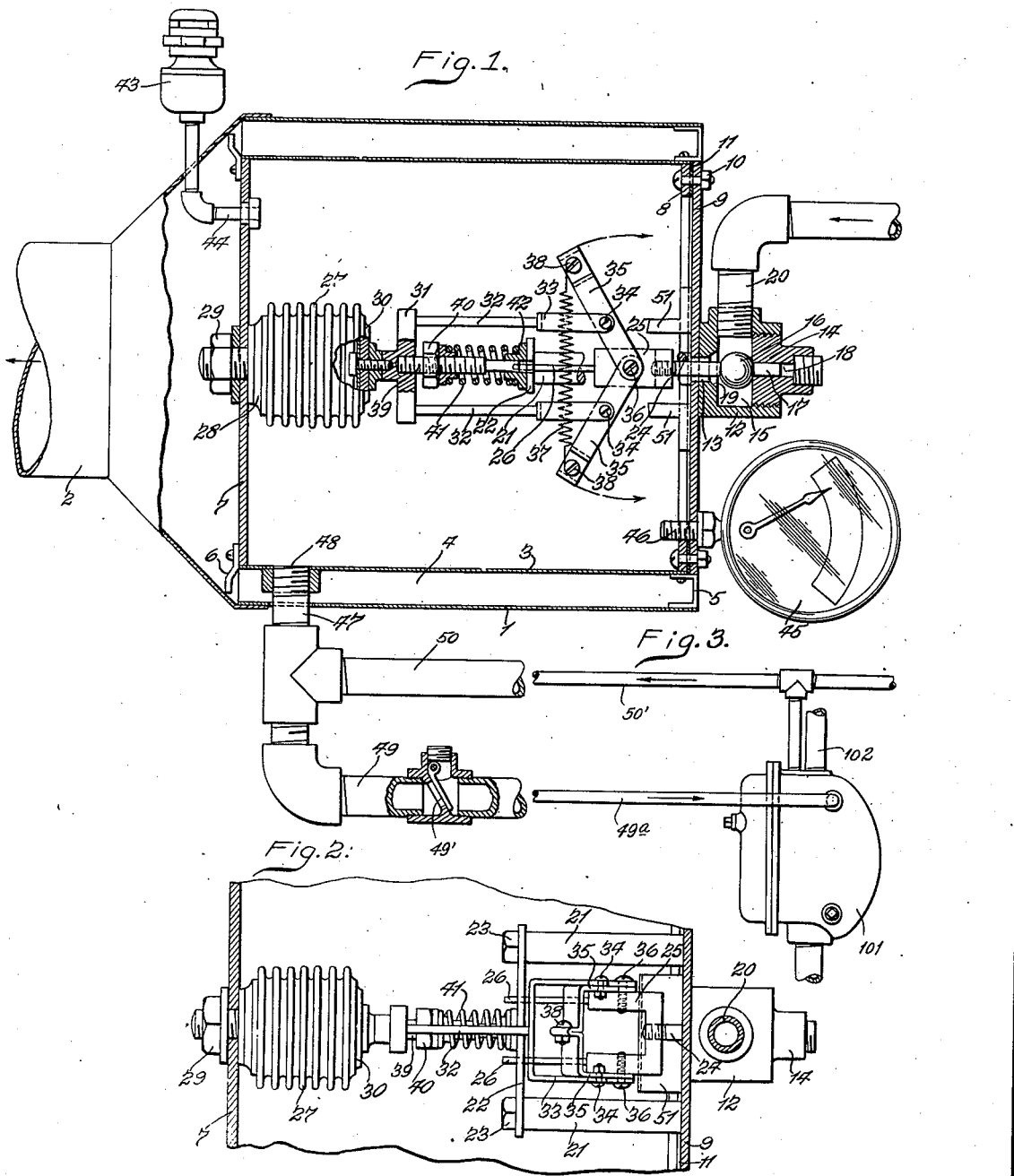
Inventor
Stanley C. Knefel
by John D. Rippey
His Attorney

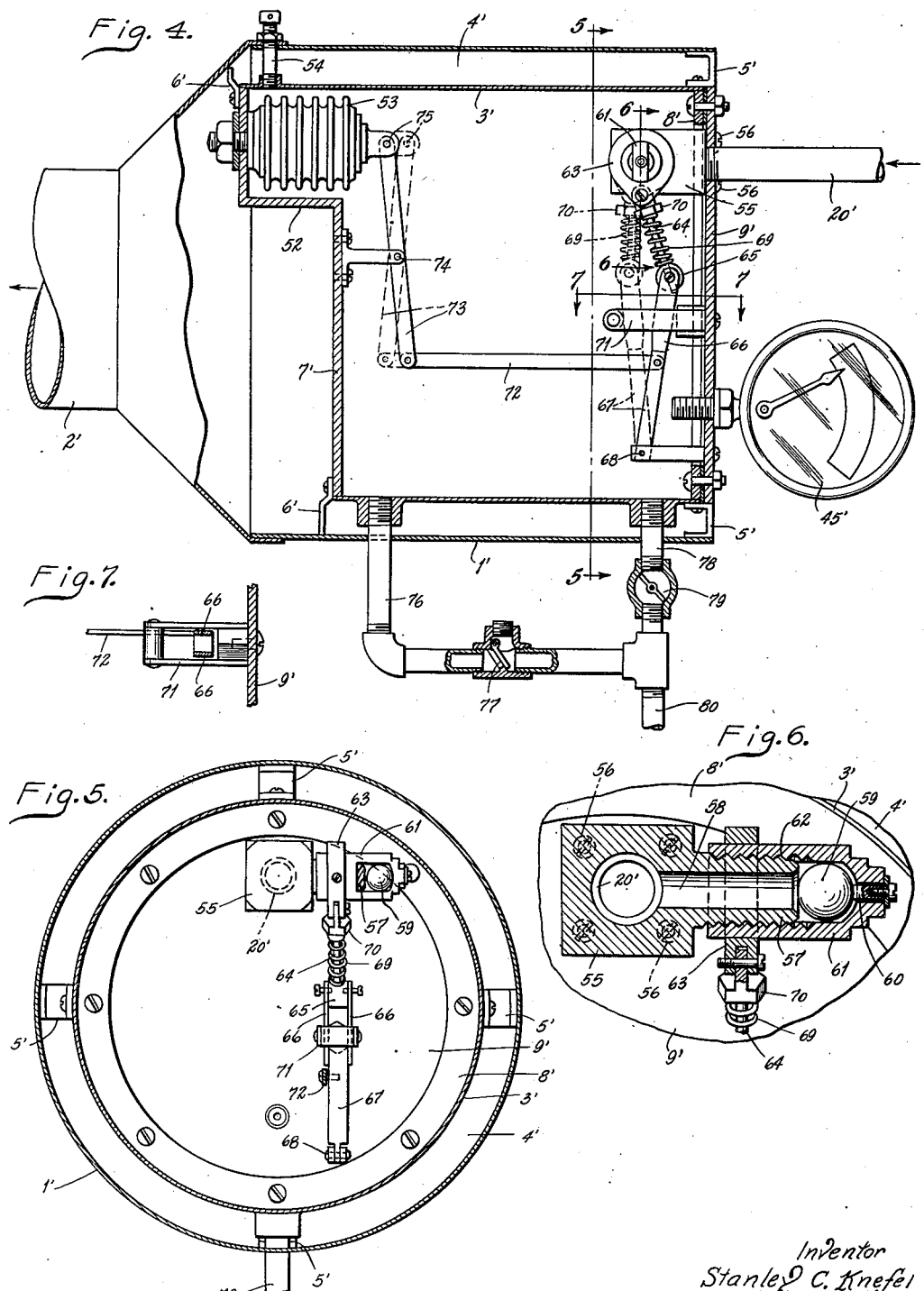

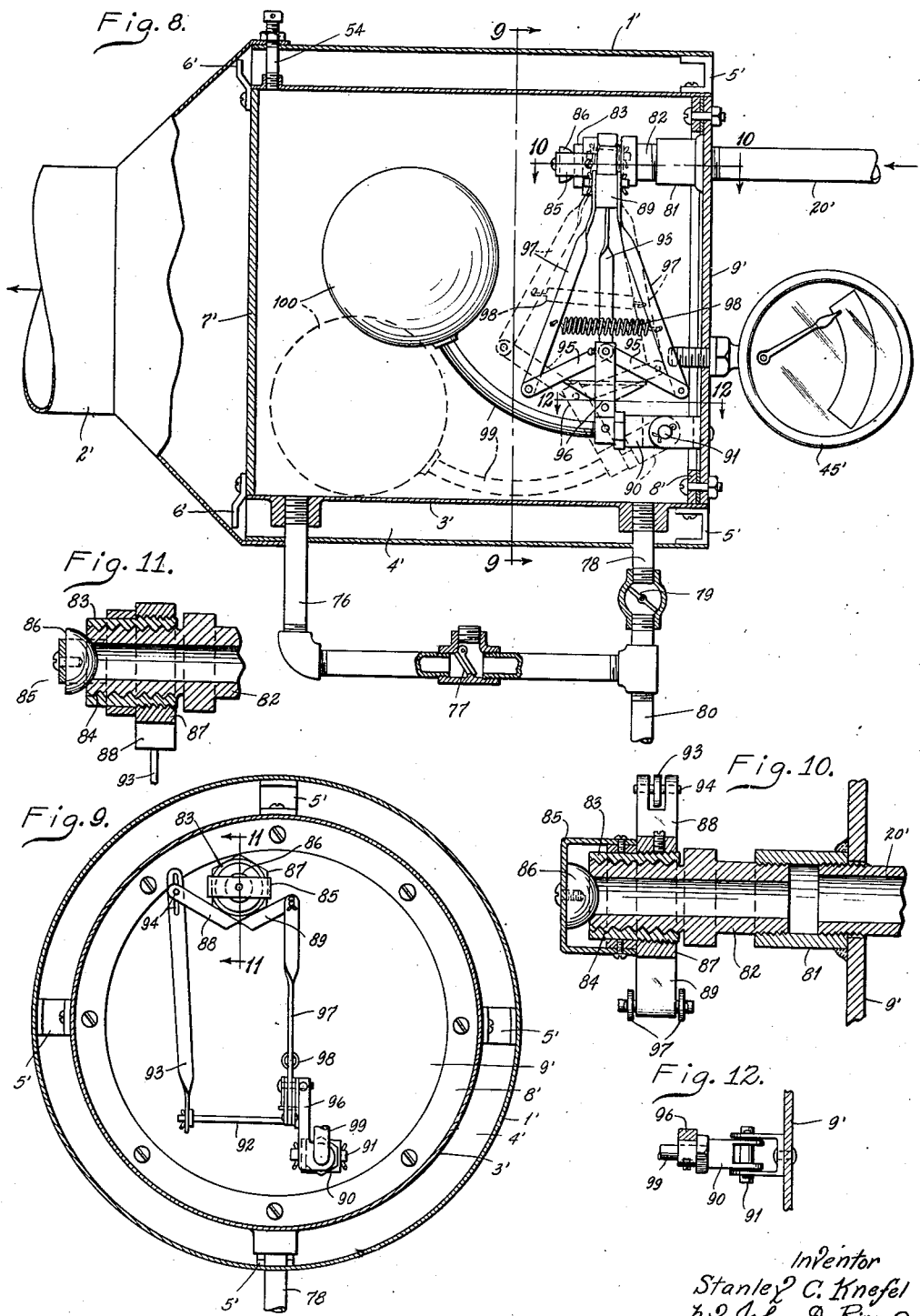

Jan. 20, 1942.    S. C. KNEFEL    2,270,532
BOILER RETURN AND VACUUM TRAP
Filed Nov. 24, 1939    5 Sheets-Sheet 4

Inventor
Stanley C. Knefel
by John D. Rippey
His Attorney.

Jan. 20, 1942.  S. C. KNEFEL  2,270,532
BOILER RETURN AND VACUUM TRAP
Filed Nov. 24, 1939  5 Sheets-Sheet 5

Inventor
Stanley C. Knefel
by John D. Rippey
His Attorney

Patented Jan. 20, 1942

2,270,532

UNITED STATES PATENT OFFICE 2,270,532

BOILER RETURN AND VACUUM TRAP

Stanley C. Knefel, St. Louis, Mo.

Application November 24, 1939, Serial No. 305,769

9 Claims. (Cl. 103—253)

This invention relates to an improved boiler return and vacuum trap for returning to a boiler condensate obtained from steam in the system to which the steam is supplied by the boiler.

Objects of the present invention are to provide an improved condenser and trap including a receptacle for receiving steam and condensing the same, in combination with improved and novel mechanism within the receptacle controlling the passage of steam thereto; to provide within the receptacle a bellows actuator controlled by the temperature in the receptacle for operating a valve to regulate the passage of steam into the receptacle for condensation and thereby control the return of condensate to the boiler; and to provide means in connection with said valve and said mechanism for moving the valve quickly to closed and to open positions when said mechanism is moved to predetermined positions by said bellows.

Other objects will appear from the following description, reference being made to the annexed drawings, in which—

Fig. 1 is a sectional view showing a preferred form of the invention.

Fig. 2 is a side elevation of the valve operating mechanism viewed at an angle of 90° from the elevation of Fig. 1.

Fig. 3 is a view showing pipe connections from a known type of boiler return trap for communication with my invention.

Fig. 4 is a sectional view similar to Fig. 1, showing another form of valve operating mechanism for automatically controlling the admission of steam into the receptacle constituting the combined condenser and trap.

Fig. 5 is a cross-sectional view on the line 5—5 of Fig. 4.

Fig. 6 is a sectional view of the valve on the line 6—6 of Fig. 4.

Fig. 7 is a sectional view on the line 7—7 of Fig. 4.

Fig. 8 is a sectional view similar to Figs. 1 and 4 showing another embodiment of the valve operating mechanism.

Fig. 9 is a cross-sectional view on the line 9—9 of Fig. 8.

Fig. 10 is an enlarged sectional view of the steam control valve on the line 10—10 of Fig. 8.

Fig. 11 is a sectional view showing further details of the steam control valve.

Fig. 12 is a detail sectional view showing the supporting bracket for the float arm on the line 12—12 of Fig. 8.

Figure 13:
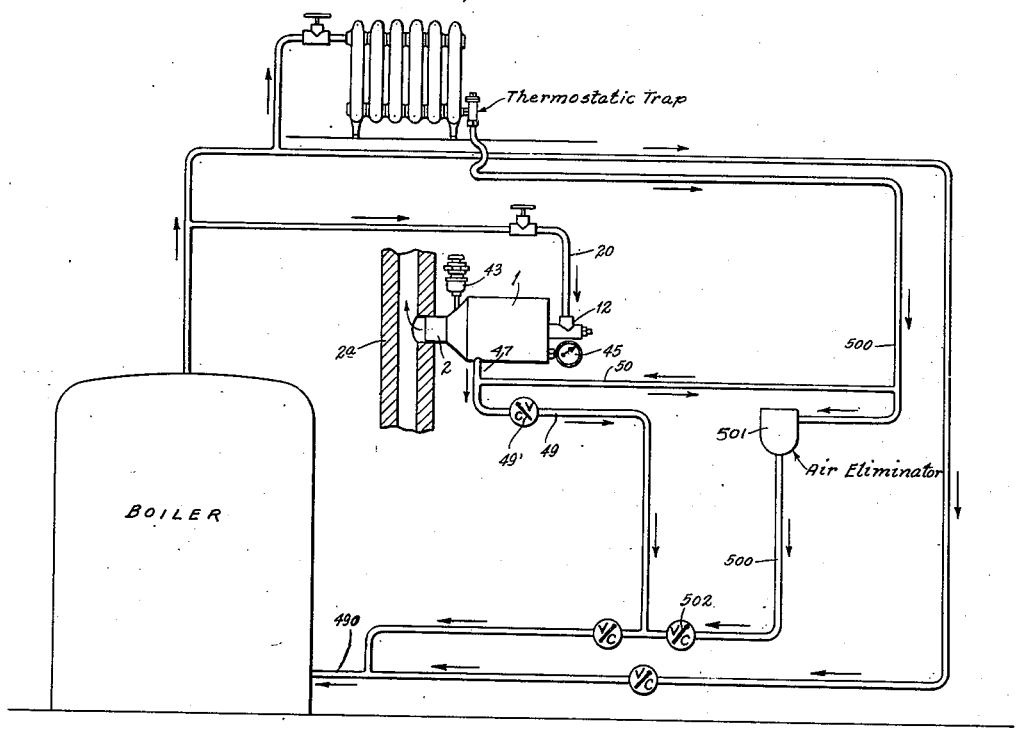
Fig. 13 is a diagrammatic elevation of a conventional form of a heating system embodying the form of the invention shown in Fig. 1.

In the construction shown, the compartment 1 has a pipe 2 leading therefrom to a flue in the building in which the device is used. A receptacle 3 is mounted within the compartment 1 and is separated therefrom by an annular space 4. A circumferential series of spacers 5 attached to one end of the receptacle 3 and another circumferential series of spacers 6 attached to the opposite end of said receptacle support the compartment 1 and receptacle 3 in a relationship to provide the space 4. The inner end of the receptacle 3 is hermetically closed by a wall 7, and the spacers 6 may be attached to the wall 7, and thereby to the receptacle 3, as shown. An annular frame 8 is attached to the opposite end of the receptacle 3 and supports an end wall 9 hermetically sealing and closing this end of said receptacle. The end wall 9 is preferably attached to the frame 8 by releasable and reengageable fasteners 10, and a hermetic sealing gasket 11 may be clamped between the wall 9 and frame 8.

A valve housing comprising a fitting 12 is rigidly attached to the center of the outer side of the wall 9, and communicates with the inside of the receptacle 3 through an opening 13. A plug 14 is screwed into the outer end of the fitting 12, providing a valve chamber 15. A valve 16 is mounted within the valve chamber 15 and has a stem 17 attached to its outer end and extending for sliding movements into a hole 18 formed in the plug 14 in axial alinement with the opening 13 and constituting means for guiding the valve in its movements to and from closed position. A seat 19 for the valve 16 is formed around the opening 13. The pipe 20 is a return pipe from the system to which steam is supplied by the boiler, and is for the purpose of returning to the boiler, through operation of the present invention, condensate of the steam in the system. This pipe 20 opens into the valve chamber 15. It is considered unnecessary to illustrate the connection of the return pipe 20 with the system in more detail than in Fig. 13 because such connection may be easily made by anyone skilled in the art to which this invention relates.

A pair of parallel posts 21 are attached to the inner side of the wall 9 at opposite sides of the opening 13, and a bar 22 is rigidly attached to the inner ends of said posts by removable and replaceable fasteners 23. A stem 24 projects from the valve 16 through the opening 13 into the receptacle 3, and has a yoke 25 rigidly attached to its inner end. Two parallel rods 26 project from the arms of the yoke 25 for sliding movements through the bar 22. These rods function to prevent the yoke 25 from becoming twisted or displaced, and to guide said yoke and thereby the valve 16 in cooperation with the stem 17.

A bellows element 27 has one end 28 detachably secured to the inner side of the wall 7 by a fastener 29, and its opposite end 30 rigidly attached to a yoke 31. Two flexible links 32 are attached at one end to the yoke 31 and at their opposite ends to brackets 33, the arms of which brackets are connected by pivots 34 with bifurcated levers 35. The ends of the levers 35 are connected to opposite sides of the yoke 25 by axially alined pivots 36. A spring 37 is engaged with projections 38 on the outer ends of the levers 35. In this arrangement, the connections 34 of the brackets 33 with the levers 35 are approximately midway between the pivots 36 and the projections 38.

A stem 39 projects from the yoke 31, and has an abutment 40 adjustably screwed thereon. A spring 41 encircles the stem 39 and has one end engaging the abutment 40 and the opposite end bearing against a stationary abutment 42, which also functions as a guide for the stem 39. The abutment 42 is rigidly attached to the bar 22.

A pressure relief valve device 43 is attached to the end wall 7 and has communication with the inside of the receptacle 3 through a tube 44, and functions in an understood manner to permit escape of steam pressure from within said receptacle when said pressure reaches or exceeds a predetermined degree. The device 43 is of known construction and detailed illustration is unnecessary. A gage 45 is attached to the wall 9 and has communication with the inside of the receptacle 3 through a tube 46, and functions in an understood manner to indicate the amount or degree of vacuum within the receptacle 3.

A pipe 47 extends through the wall of the compartment 1 and opens into the receptacle 3 through an attaching fitting 48. The pipe 47 receives and conducts condensate from the receptacle 3 to a pipe 49 which returns the condensate to the system condensate pipe 500 and thence to the boiler through the conventional system pipe 490 (Fig. 13). The pipe 49 contains a check valve 49' to prevent flow of condensate to the receptacle 3 through said pipe and valve. A pipe 50 forms a communication from the system condensate pipe 500 to the pipe 47 between the receptacle 3 and the valve 49', so that condensate from the system may enter the receptacle intermittently, as later described. The condensate pipe 500 of the system has communication through the usual air eliminator 501 and check valve 502 with the system return pipe 490.

As shown in said Fig. 13, the device is connected by the pipe 20 to the system to which steam is supplied by the boiler; and is connected with the pipes 500 and 490 of the heating system by the pipes 47 and 49. The pipe 50 forms a communication to the pipe 47 from the condensate pipe 500 of the heating system. When the apparatus is not subject to the heat of the steam within the system, the bellows device 27 is retracted as shown, thereby holding the elements in the relationship shown in Fig. 1. Air may freely pass from the room or enclosure in which the device is mounted through the space 4 and the pipe 2 to the flue. In this arrangement, the valve 16 is held away from the seat 19, and the passage 13 is open. Steam from the system may pass from the pipe 20 through the chamber 15 and passage 13 into the receptacle 3, thereby heating and expanding the bellows 27 and forcing air from within said receptacle to the outside through the vent device 43. Expansion of the bellows 28 moves the yoke 31 and thereby operates the levers 35 about the pivots 26 until the projections 38 pass beyond the positions in which they are alined with the pivots 36. The moment the projections 38 pass beyond dead center, which is to say beyond alinement with the pivots 36, the spring 37 acts quickly to move the yoke 25 in a direction away from the wall 9, thereby moving the valve 26 to closed position against the valve seat 19. Extent of such movement of the levers 35 is limited by abutments 51 attached to the wall 19. When the valve 16 is closed in this manner, further passage of steam into the receptacle 3 is prevented, thereby permitting the cooling draft of air through the passage 4 to condense the steam within the receptacle 3 and permit the condensate to pass therefrom through the pipe 47. When the bellows 27 becomes cooled to a predetermined degree, it is again retracted or compressed, thereby operating the levers 35 about the pivots 36 toward the positions shown in Fig. 1, the yoke 25 being held from further movement by engagement of the valve 16 against the seat 19. When the projections 38 pass beyond dead center, which is to say beyond alinement with the pivots 36, the spring 37 immediately retracts, thereby cooperating with the bellows 27 to close said bellows. This action of the levers 35 moves the yoke 25 toward the wall 9, and thereby moves the valve 16 away from the seat 19 and opens the passage 13. This permits steam to pass from the pipe 20 through the valve chamber 15 and the passage 13 into the receptacle 3. These operations are repeated intermittently and indefinitely as long as a supply of steam is available through the pipe 20 for admission to the receptacle 3 to heat and expand the bellows 27 as described.

In this form of the invention, when the device is not in use the bellows 27 is contracted and the valve 16 is open. In operation, a part of the first steam entering the system from the boiler passes through the pipe 20 into the receptacle 3, and forces air from said receptacle through the automatic air valve vent 43. When the temperature in said receptacle 3 is increased by the steam, the bellows 27 expands and thereby closes the valve 16. Cool air passes through the compartment 1 and around the receptacle 3 and cools and condenses the steam, thereby producing a partial vacuum and, after an interval, the bellows 27 cools and contracts, thereby opening the valve 16 which had remained closed while the bellows 27 remained expanded. The partial vacuum that had been created in the receptacle 3 by condensation of steam therein draws into said receptacle condensate from the system through the pipe 50 (Fig. 13) during the time that the valve 16 remains closed, as aforesaid. The accumulated condensate is drained by gravity from said receptacle through the pipes 47 and 49, which open into the system condensate pipe 500 at the effluent side of the valve 502. When the valve 16 is reopened by contraction of the bellows 27, steam is again admitted into the receptacle 3 until the bellows 27 operates to close said valve. This intermittent expansion and contraction of the bellows 27 and consequent intermittent opening and closing of the valve 16 is repeated as long as steam is available in the system to which the device is connected.

Figure 15:
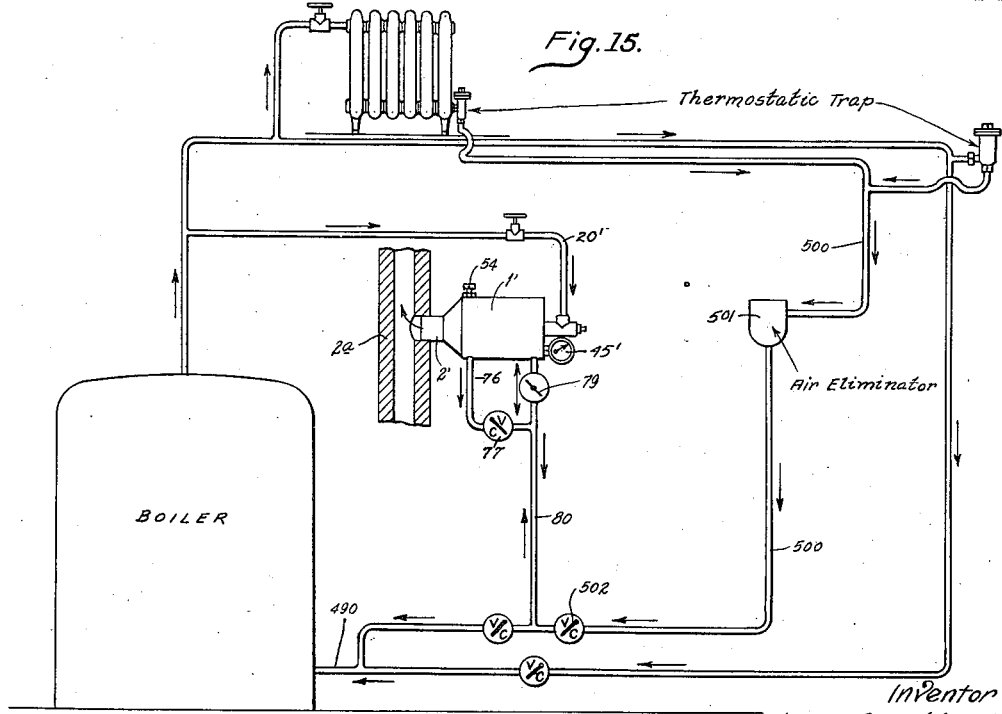
Fig. 15 is a diagrammatic elevation of the same type of heating system embodying the form of the invention shown in Fig. 4.

In the modified form of the invention shown in detail in Figs. 4 to 7, inclusive, and shown installed in a heating system in Fig. 15, the compartment 1', pipe 2', receptacle 3', space 4', spacers 5' and 6', frame 8', and outer wall 9' are substantially the same as the parts designated by the same reference numerals without exponents in the preceding description. The inner wall 7' of the receptacle 3 is provided with a recess 52 at the upper side of the receptacle 3', and an expansible and contractible bellows element 53 is attached in said recess. An air vent valve device 54 of known construction opens from the recess 52 through the walls 3' and 1' to the outside of the compartment 1. The steam return pipe 20', which, like the return pipe 20 communicates with the system, opens through the wall 9, into a fitting 55 attached to the inner side of said wall 9' by removable and replaceable fasteners 56. The fitting 55 has a lateral extension 57 provided with an opening 58 adapted to be opened and closed by a valve 59. The valve 59 is attached to a stem 60 having swivel connection with a cage 61 screwed on the extension 57 by long threads 62 so that only slight turning movement is required for the cage 61 to move the valve 59 to and from position to close the end of the passage 58. A yoke 63 is rigidly attached to the cage 61 and is pivotally connected with the upper end of a link 64, the lower end of which extends for sliding movement through a block 65 pivoted between the arms 66 rigid with a lever 67 the lower end of which is supported on a pivot device 68 rigidly attached to the end wall 9'. A spring 69 mounted on the link 64 is confined between the block 65 and an upper abutment 70. Extent of swinging movements of the lever 67 is limited by a frame device 71 attached to the wall 9'.

A link 72 has one end pivoted to the lever 67 and the opposite end pivoted to the lower end of a lever 73 mounted on a pivot device 74 attached to the end wall 7'. The upper end of the lever 73 is connected by a pivot device 75 with the inner end of the expansible and contractible bellows 53. A pipe 76 opens into the receptacle 3' and is equipped with a check valve 77 permitting outflow of the condensate from said receptacle 3' and preventing return flow of water thereto. A pipe connection 78 including a butterfly valve 79 forms communication to the receptacle 3' from the pipe 80 opening into the system condensate pipe 500 at the effluent side of the valve 502, the same as the pipe 49 opens into said condensate pipe. The condensate outlet pipe 76 from the receptacle 3' also opens into the pipe 80, as shown, in order to return to the boiler condensate from the receptacle 3'. When this specific form of the invention is in operation, and the butterfly valve 79 is open, and steam is condensed in the receptacle 3', condensate from the system pipe 500 may enter said receptacle 3' and prevent or restrict formation of vacuum therein during the time that the valve 59 remains closed. The accumulated condensate contained in the receptacle 3' is then drained therefrom by gravity through the pipes 76 and 78. When the valve 59 is reopened by contraction of the bellows 53, steam is again admitted into the receptacle 3' until the bellows 53 operates to close said valve. The valve 79 may be adjusted to regulate the flow of condensate in either direction through the pipe 78.

As shown in Fig. 4, the parts are in the positions they occupy when the bellows 53 is contracted, which is its condition when it is not in use or when it is not subject to the heat of steam. In this contracted position, the lever 67 is held in the solid line position shown (Fig. 4), and the cage 61 is in its outward position to which it is moved by the threads 62 when turned to this position by the lever 67 and the link 64. This leaves the valve 59 open and free from restraint so that steam may enter the receptacle 3' through the pipe 20', fitting 55 and passage 58. The steam will force the air to the top of said receptacle and into the recess or space 52 and thence out through the air vent valve device 54. The air prevents intimate contact of the steam with the bellows 53 until a substantial amount of steam has entered the receptacle 3' and until the relatively cool air in said receptacle has been forced to the top and into the recess or space 52. After the cool air has been forced to the top of the receptacle 3' by pressure of the steam, the valve device 54 is caused to open by such air pressure and the air contained in the receptacle 3' is forced out. The steam then contacts with and causes expansion of the bellows 53, which moves the lever 73 from the solid line position to the broken line position shown, and the lever 67 and link 64 from the solid line position to the broken line position shown (Fig. 4). This turns the cage 61 in a direction to move the cage toward the fitting 55 and thereby press the valve 59 against its seat at the outer end of the passage 58, thereby closing said passage and preventing further admission of steam into the receptacle 3'. During this time, cooling air currents pass through the space 4', the pipe 2' and to discharge through a flue or the like. The moment the link 64 and the lever 67 pass beyond alined or dead center position in either direction, the spring 69 acts immediately to throw said parts completely to either limit of their movement within the frame 71, thereby quickly opening or quickly closing the valve 59. The gage 45' is arranged and functions the same as does the gage 45.

Figs. 8 to 12, inclusive, show a modified form of valve control mechanism which does not include the bellows devices disclosed in the preceding description and drawings. This form of the invention comprises a compartment 1', a pipe 2', a receptacle 3', a space 4', spacers 5' and 6', frame 8', and outer end wall 9' supporting a gage 45', as in Fig. 8; an inner end wall 7' like the inner end wall 7 in Fig. 1, a condensate outlet pipe 76 with check valve 77, and pipe 78 with butterfly valves 79, as in Fig. 4.

A union 81 is attached to the inner side of the wall 9', and the steam return pipe 20' opens into this union. A tubular fitting 82 is attached to the union 81 within the receptacle 3'. A sleeve 83 is screwed on the fitting 82 by long threads 84. A frame 85 attached to the sleeve 83 supports a valve 86 movable to and from position to close the outer end of the passage through the fitting 82. A yoke 87 is attached to the sleeve 83 for turning the same about the rigid fitting 82 to move the valve 86 in one direction to close the passage through the fitting 82 and in the opposite direction to open said passage. Oppositely extended arms 88 and 89 are rigid with the yoke 87.

A frame 90 is supported on a pivot device 91 secured to the wall 9', and has a laterally extended arm 92. A link 93 is pivoted at one end to the arm 92 and at its opposite end has pivotal pin and slot connection 94 with the arm 88. Two links 95 have their adjacent ends pivoted to and upward extension 96 of the frame 90, and the outer ends of said links 95 are connected by links 97 with the arm 89. A spring 98 connects the two links 97 for imparting final movements thereto after the links 95 are moved beyond straight or dead center position in either direction. A lever 99 has one end attached to the frame 90 and its opposite end connected with an actuator or float 100.

As shown in solid lines in Fig. 8, the parts are in the positions they occupy when the valve 86 is closed. Said valve 86 is opened when the device is not in use, or when the receptacle 3' does not contain a sufficient amount of water or condensate to raise the float 100 far enough to move the links 95 to alined or dead center positions. When upward movement of the float 100 moves the links 95 slightly beyond alined or dead center positions, the spring 98 acts to move the links 97 a further distance toward each other, thereby cooperating with the links 95 to move said links 97 downwardly. This downward movement of the links 97 operates the arm 89 and thereby turns the sleeve 83 in a direction to move said sleeve quickly along the fitting 82 to close the valve 86 and stop further flow of steam into the receptacle 3'. Entrance of the steam into the receptacle 3' forces the air therefrom through the air vent valve device 54. Steam entering the receptacle 3' is condensed by the cooling currents of air passing continuously through the space 4'.

This form of the invention is mounted in the system in the same way that the device of Fig. 4 is mounted therein. Fig. 15 shows the device of Fig. 4 as well as the device of Fig. 8 located in the system. When this specific form of the invention is in operation and steam is condensed in the receptacle 3' while the valve 79 is open, condensate from the system pipe 500 may enter the receptacle 3'. When the valve 79 is closed, condensate from the pipe 500 cannot enter the receptacle 3' although steam may continuously enter and be condensed in said receptacle until the float 100 is raised to the proper height to close the valve 86. When the valve 86 is closed, steam is thereby prevented from entering the receptacle 3 from the system through the pipe 20' until the accumulated condensate contained in the receptacle 3' is drained therefrom by gravity through the pipes 76 and 78. Air may slowly enter the receptacle 3' with the condensate from the system while the accumulated condensate is passing from said receptacle by gravity through the outlet pipe 76. When the float 100 lowers far enough to open the valve 86, additional steam may enter the receptacle 3' and be condensed therein, as formerly. These operations may be repeated over and over again, as in the case of the invention first described.

Figure 14:
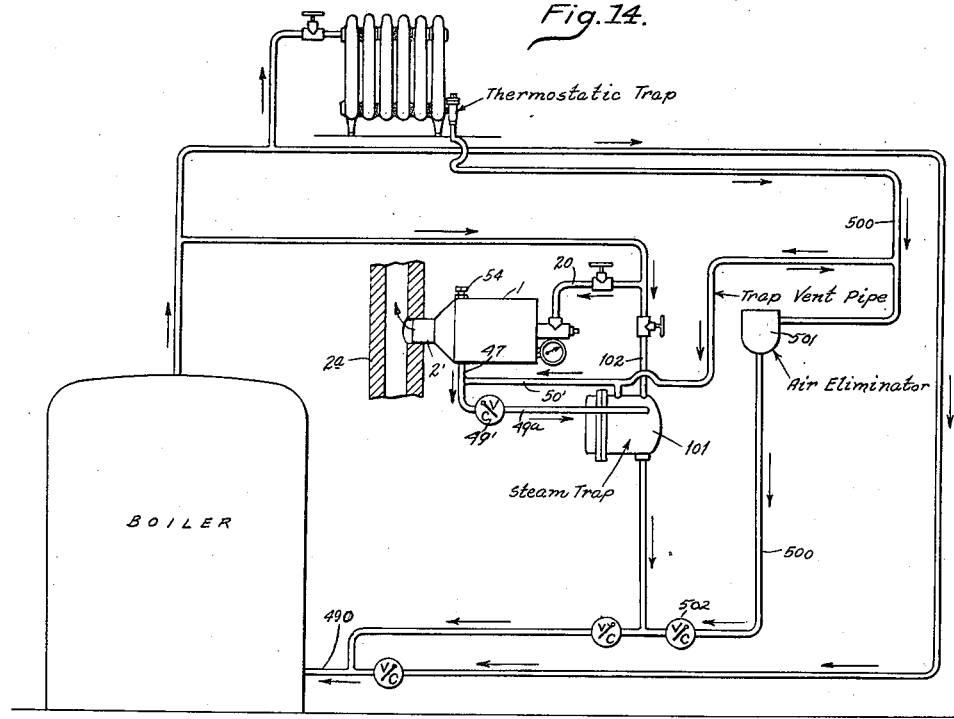
Fig. 14 is a similar view of the same form of heating system modified to combine the trap of Fig. 3 with the device shown in Fig. 1.

As shown in Figs. 3 and 14, either form of the present invention may be arranged in a heating system containing a well known "Webster" boiler return trap 101. In such assembly, the pipe 49a forms communication from the pipe 47 into the trap 101 and is equipped with the valve 49'. The pipe 50' opens from the condensate return pipe 500 of the system into the upper portion of the "Webster" trap 101, and also has an extension opening into the pipe 47 between the receptacle 3 and the valve 49'. The pipe 49a forms communication from the trap 101 to the condensate return pipe 500 beyond the effluent side of the valve 502. The pipe 102 forms a communication from the heating system into the trap 101 and, as shown, may open from the pipe 20. When this specific form of the invention is in use and steam is condensed in the receptacle 3 or 3', condensate from the pipe 500 may enter said receptacle and prevent or restrict formation of vacuum therein during the time that either control valve 16, 59 or 86 remains closed. When either of said valves is again opened by the specific mechanism associated therewith and already described, steam enters the receptacle 3' from the system through the pipe 20 or 20' and the accumulated condensate contained in the receptacle is drained therefrom by gravity through the pipe 47 or through the pipe 76, according to the embodiment of the invention used. As is known, the "Webster" return trap 101 includes means not herein shown to prevent flow of condensate therefrom back into the pipe 50'.

It should now be apparent that either embodiment of this invention attains all of its objects and purposes efficiently, automatically and satisfactorily. The construction and arrangement of the various elements comprising the invention may be changed and modified in other particulars than those specifically shown and within the scope of equivalent limits as required to adapt the invention for its different intended uses.

I claim:

1. A device of the character described comprising a receptacle constituting a combined condenser and vacuum trap and having opposite end walls, means forming a passage for admitting live steam through one of said walls into said receptacle, a thermostatic bellows device attached to the opposite end wall in said receptacle, a valve for opening and closing said passage, mechanism supported apart from said bellows for moving said valve to closed and to open positions and vice versa, and connections operated by said bellows for conditioning said mechanism for operation relative to said bellows to operate said valve.

2. A device of the character described comprising a receptacle constituting a combined condenser and vacuum trap and having opposite end walls, means forming a passage for admitting live steam through one of said walls into said receptacle, a thermostatic bellows device attached to the opposite end wall in said receptacle, a valve for opening and closing said passage, mechanism supported apart from said bellows for moving said valve to closed and to open positions and vice versa, and connections operated by said bellows for conditioning said mechanism to close said valve when said bellows expands a predetermined extent and to open said valve when said bellows contracts a predetermined extent.

3. A device of the character described comprising a receptacle forming a combined condenser and vacuum trap, means forming a passage for admitting live steam into said receptacle, a valve for opening and closing said passage to control the admission of steam into said receptacle, an expansible and contractible bellows device, rigid means supporting said bellows within said receptacle, mechanism for moving said valve from closed to open positions and vice versa, means wholly apart from said bellows for supporting said mechanism, a spring for operating said mechanism, and means attached to said bellows and also attached to said mechanism and operated by said bellows for imparting initial movements to said mechanism and simultaneously tensioning said spring and leaving said spring free to impart final movements to said mechanism to move said valve to open and to closed positions respectively.

4. A device of the character described comprising a receptacle forming a combined condenser and vacuum trap, means forming a passage for admitting live steam into said receptacle, a valve for opening and closing said passage to control the admission of steam into said receptacle, an expansible and contractible bellows device, rigid means supporting said bellows within said receptacle, mechanism for moving said valve from closed to open positions and vice versa, means wholly apart from said bellows for supporting said mechanism, a spring for operating said mechanism, and means attached to said bellows and also attached to said mechanism and operated by said bellows for imparting initial movements to said mechanism and simultaneously tensioning said spring and leaving said spring free to impart final movements to said mechanism to move said valve to open position when said bellows is contracted and to move said valve to closed position when said bellows is expanded by live steam in said receptacle.

5. A device of the character described comprising a receptacle constituting a combined condenser and vacuum trap and having a passage for the admission of steam thereto, a valve for opening and closing said passage, levers pivoted to said valve for moving said valve to open and to closed positions, an expansible and contractible bellows device in said receptacle, links attached to said bellows and also to said levers for imparting initial movements to said levers, and a spring connected with said levers and tensioned by initial movements thereof by said bellows for imparting final movements to said levers to move said valve to open and to closed positions respectively by contraction and expansion of said bellows.

6. A device of the character described comprising a receptacle constituting a combined condenser and vacuum trap and having a passage for the admission of steam thereto, a valve for opening and closing said passage, levers for moving said valve to open and to closed positions, an expansible and contractible bellows device in said receptacle connected with said levers for imparting initial movements thereto, a spring connected with said levers and tensioned by initial movements thereof for imparting final movements to said levers to move said valve to open and to closed positions by contraction and expansion of said bellows, and a pipe opening into said receptacle for admitting fluid thereto preparatory for withdrawal of condensate from said receptacle.

7. A device of the character described comprising a receptacle constituting a combined condenser and vacuum trap and having opposite end walls, means forming a passage for admitting live steam through one of said walls into said receptacle, means forming an outwardly extended recess in the upper portion of said receptacle at one end thereof, a thermostatic bellows device attached in said recess, air venting means communicating with said recess for discharging air therefrom when live steam is admitted into said receptacle, a valve for opening and closing said passage, mechanism for moving said valve to open and to closed positions, and elements attached to said bellows and also to said mechanism for initially operating said mechanism by said bellows when said valve is in either of said positions.

8. A device of the character described comprising a receptacle constituting a combined condenser and vacuum trap and having opposite end walls, means forming a passage for admitting live steam through one of said walls into said receptacle, means forming an outwardly extended recess in the upper portion of said receptacle at one end thereof, a thermostatic bellows device attached in said recess, air venting means communicating with said recess for discharging air therefrom when live steam is admitted into said receptacle, a valve for opening and closing said passage, and mechanism attached to said bellows and also to said valve and operated by said bellows for moving said valve to open position when said bellows is contracted and to closed position when said bellows is expanded.

9. A device of the character described comprising a receptacle constituting a combined condenser and vacuum trap and having opposite end walls, means forming a passage for admitting live steam through one of said walls into said receptacle, means forming an outwardly extended recess in the upper portion of said receptacle at one end thereof, a thermostatic bellows device attached in said recess, air venting means communicating with said recess for discharging air therefrom when live steam is admitted into said receptacle, a valve for opening and closing said passage, connections attached to said bellows and also to said valve and operated by said bellows to impart initial movement to said valve from closed position toward open position during contraction of said bellows and to impart initial movement to said valve from open position toward closed position during expansion of said bellows, and means cooperating with said connections for imparting final movements to said valve to open and to closed positions, respectively.

STANLEY C. KNEFEL.